United States Patent
Frecska et al.

(10) Patent No.: US 6,941,193 B2
(45) Date of Patent: Sep. 6, 2005

(54) SENSOR SYSTEM FOR MEASURING AND MONITORING INDOOR AIR QUALITY

(75) Inventors: Sandor A. Frecska, Lancaster, PA (US); Wesley T. K. Bischel, Lancaster, PA (US)

(73) Assignee: AWI Licensing Company, Wilmington, DE (US)

(*) Notice: Subject to any disclaimer, the term of this patent is extended or adjusted under 35 U.S.C. 154(b) by 0 days.

(21) Appl. No.: 10/365,283

(22) Filed: Feb. 12, 2003

(65) Prior Publication Data
US 2004/0158359 A1 Aug. 12, 2004

(51) Int. Cl.[7] .............................................. G05B 19/00
(52) U.S. Cl. ...................... 700/276; 700/277; 236/49.3; 454/254
(58) Field of Search .................................. 700/275, 276, 700/277, 278; 236/440, 49.1, 49.3, 51; 454/254, 256, 258

(56) References Cited

U.S. PATENT DOCUMENTS

| | | | | |
|---|---|---|---|---|
| 5,114,070 A | * | 5/1992 | Lilja et al. | 236/49.3 |
| 5,261,596 A | * | 11/1993 | Tachibana et al. | 236/49.3 |
| 5,279,609 A | * | 1/1994 | Meckler | 236/49.3 |
| 5,292,280 A | * | 3/1994 | Janu et al. | 454/229 |
| 5,394,934 A | * | 3/1995 | Rein et al. | 165/200 |
| 5,428,964 A | * | 7/1995 | Lobdell | 62/176.6 |
| 5,520,328 A | * | 5/1996 | Bujak, Jr. | 236/44 A |
| 5,589,824 A | * | 12/1996 | Lynch | 340/628 |
| 5,786,525 A | * | 7/1998 | Freund et al. | 73/1.34 |
| 6,111,501 A | | 8/2000 | Honeyager et al. | 340/521 |
| 6,125,710 A | | 10/2000 | Sharp | 73/863.31 |
| 6,514,721 B2 | * | 2/2003 | Spurrell | 435/30 |

* cited by examiner

*Primary Examiner*—Jayprakash N. Gandhi

(57) ABSTRACT

An apparatus for accurately sensing room conditions and positioned in the air stream to the return air plenum. The apparatus is a combination of a temperature and volatile organic compound (VOC) sensor. The sensor module is built into a ceiling grid system with the body of the sensor module extending into the return air plenum. The ceiling grid has a slot fabricated into its face which allows the air stream from the room to flow by the sensors on its way to the plenum. This enables both the temperature and the composition of the air to be monitored at the optimal location. A portable pollution sensor device that measures and monitors leading indicators of indoor air quality and the extent of pollution is used in conjunction with the ceiling grid mounted sensor modules. The portable device documents and benchmarks air quality both in buildings under construction and in existing buildings. The portable device is network-enabled so as to simultaneously transmit the data to various control devices. In addition to its use to monitor areas not otherwise covered by the ceiling grid mounted sensors, the hand-held sensor can be used during building construction to determine the best locations in the ceiling grid system for mounting of the fixed pollution sensors.

26 Claims, 5 Drawing Sheets

SENSOR SYSTEM FOR MEASURING AND MONITORING INDOOR AIR QUALITY

BACKGROUND OF THE INVENTION

The present invention relates generally to indoor air quality measurement, and more specifically to devices for monitoring the temperature and quality of air in building environments.

Indoor air quality (IAQ) has become an important consideration in creating a satisfactory environment for today's building occupants, particularly in office buildings, schools, and health care facilities. Indoor air quality is a constantly changing interaction of a complex set of factors, which must be considered when looking for an indoor air quality problem. These factors include the source of contamination or discomfort; the heating, ventilating and air conditioning (HVAC) system not being able to control existing air contaminants and ensure thermal comfort; pollutant pathways connecting the pollutant source to the occupants with a driving force existing to move pollutants along the pathways; and the building occupants that are affected by the indoor air quality.

Indoor air contaminants can originate within the building or be drawn in from outdoors. One technique for controlling odors and contaminants is to dilute them with outdoor air. However, dilution can only work if there is a consistent flow of supply air that effectively mixes with the room air. Air flow patterns in buildings result from the combined action of mechanical ventilation systems, human activity and natural forces. Pressure differentials created by these forces move airborne contaminants from areas of relatively higher pressures, to areas of relatively lower pressure through any available openings. All of a building's walls, ceilings, floors, HVAC equipment and occupants interact to affect the distribution of contaminants. Since different people have different sensitivities to contaminants, one individual may react to a particular IAQ problem differently than surrounding occupants. The effects of indoor air quality problems are often non-specific symptoms, rather than clearly defined illnesses. The air quality in commercial buildings such as office complexes and educational institutions is primarily controlled by thermostats. The thermostats are distributed within the workspace and are used to control Variable Air Volume (VAV) boxes or other aspects of the building HVAC system. The HVAC system includes all heating, cooling, and ventilation equipment that serves a building. This includes furnaces or boilers, chillers, cooling towers, air handling units, exhaust fans, ductwork, filters, and piping. HVAC systems maintain air quality by mixing fresh outdoor air with the indoor air. VAV systems work on the principle that space temperature can be maintained by varying the volume of air delivered to a space as the load changes. As the load decreases in the space, the VAV system throttles the air flow to match the space requirements. As the VAV terminal box opens and closes, the static pressure in the ducting increases and decreases. The change in pressure is sensed by the VAV controller which reacts to vary the air delivered by the unit. In this application, HVAC and VAV systems will be referred to generally as building energy management systems.

Both the American Society of Heating, Refrigeration, and Air Conditioning Engineers (ASHRAE) and OSHA have established rules for proper ventilation. OSHA estimates that the excess risk of developing the type of non-migraine headache that may require medical attention or restrict activity, which has been associated with poor indoor air quality, is 57 per 1000 exposed employees. In addition, the excess risk of developing upper respiratory infections that are severe enough to require medical attention or restrict activity is estimated to be 85 per 1000 exposed employees. These numbers were extrapolated from actual field studies and therefore show the magnitude of the present problem. ASHRAE has specified minimums for ventilation rates and indoor air quality that will be acceptable to occupants. These requirements are published in ASHRAE Standard 62-1989.

The maximum amount of ventilation provided by an HVAC system may be limited, not only by the system's capacity, but also by the temperature and humidity of the outside air. Uniformity of temperature is important to individual comfort. Humidity is also a factor in thermal comfort. Raising relative humidity reduces the ability to lose heat through perspiration and evaporation, so that the effect is similar to raising the temperature. Since the outdoor air may be substantially hotter or colder than the specified indoor air temperature, the HVAC system must work harder to reach the specified temperature set point. This results in inefficient use of building energy and waste. However, temperature alone is not a sufficient indicator of indoor air quality. The level of personal comfort is closely related to other gases in the atmosphere. New building construction techniques and materials significantly aggravate air quality problems because of the out gassing of undesirable substances, such as Volatile Organic Compounds (VOCs). VOCs include carbon dioxide ($CO_2$), carbon monoxide (CO), formaldehyde, and other compounds. $CO_2$ sensors can be used in addition to temperature sensors (i.e., thermostats), but $CO_2$ sensors are expensive and therefore are used very infrequently. When they are used, they tend to be located in the return plenum or in the ducts. This technique frequently combines return air from several occupied spaces and gives no direct indication of the quality of the air in a specified space. An inexpensive sensor system is needed that accurately represents room conditions, yet is in the air stream to the return air plenum.

Most pollution sensor devices are expensive laboratory equipment or stationary wall or ceiling mounted systems. Commercial and residential units typically monitor only one variable. In addition to the need for multiple sensor devices located in the return air flow, what is also needed is a multiple sensor device that is mobile and can have its data downloaded in real-time to a system or network from which the air flow temperature and mix can be controlled. The mobility of a hand-held pollution tester allows for the testing of various spaces in a building that can be overlooked by the placement of stationary devices. For example, during new construction, it is easy to monitor the contribution of each new building component, such as carpets and ceiling tiles, to the indoor environment. Therefore, what is needed is a portable device that can be used where existing sensor systems are inadequate, out-of-date, or lacking specific sensors.

In the prior art, U.S. Pat. No. 6,125,710 to Sharp discloses a networked air measurement system that includes a sensor for measuring a characteristic of an air sample, the sensor having an inlet port, a backbone tube in communication with the air inlet port of the sensor, a plurality of air intake valves in communication with the backbone tube with air admitted through one of the plurality of air intake valves communicated into the backbone tube. The system further includes an air flow induction device that is in communication with air in the system, air being moved by the air flow induction device from the plurality of air intake valves, through the backbone tube to the sensor. A controller is connected to the sensor and to each air intake valve and executes a control sequence, which opens and closes air intake valves to admit air and form air samples that are communicated to the sensor. The controller uses time intervals or air sample measurements to determine the appropriate times at which to open individual air intake valves.

Also in the prior art, U.S. Pat. No. 6,111,501 to Honeyager, et al. discloses a hand-held environmental monitor for monitoring environmental or physiological conditions affecting the user. The monitor includes a main housing and a sensor module. The sensor module has a plurality of sensors extending from it. The sensor module is generally cylindrical in shape and rests in a curved cradle of the main housing. The sensor module rotates between a position in which the sensors are deployed and extend outwardly from the main housing, and a position in which the sensors rest in the main housing. The main housing also contains processor-based electronics circuitry for processing the data acquired by the sensors. The sensor module contains sensor electronics circuitry, including all circuitry that is unique to the sensors, and is detachable from the main housing. This permits sensor modules having the same or different sensors to be interchanged.

SUMMARY OF THE INVENTION

The present invention provides an apparatus for accurately sensing room conditions that is located in the air stream to the return air plenum. The apparatus is a combination of a temperature and VOC sensor. The sensor module is built into a ceiling grid system with the body of the sensor module extending into the return air plenum. The ceiling grid has a slot fabricated into its face which allows the air stream from the room to flow by the sensors on its way to the plenum. This enables both the temperature and the composition of the air to be monitored at the best location for n enclosed space.

The present invention also provides an easily portable pollution sensor device that measures and monitors leading indicators of indoor air quality and the extent of pollution. The portable device documents and benchmarks air quality using Indoor Air Quality (IAQ) profiles both in buildings under construction and in existing buildings. Besides logging the measured data, the device is network-enabled so as to simultaneously transmit the data to various control devices and control centers. In addition to its use to monitor areas not otherwise covered by the ceiling grid mounted pollution sensors, the handheld tester can be used during building construction to determine the best locations in the ceiling grid system for mounting of the fixed pollution sensors.

The hand-held pollution tester includes a multiple sensor array module, a microprocessor module, a communication module, and a power pack. The sensors sense specific gases such as CO, $CO_2$, VOCs, as well as temperature and humidity. The device is self-powered via batteries, or can be plugged into a 110 v AC outlet. The device is capable of storing the data and/or transmitting them via wired, wireless, or other means such as infrared, to a networked device or computer.

The ceiling grid mounted pollution sensors along with at least one hand-held pollution concert operate in concert to measure and monitor air quality at any location within a building. Positioning a plurality of web-mounted pollution sensors above the ceiling panels provides for more accurate measurement of the air flow from enclosed spaces to the plenum above the ceiling grid system. The hand-held units can then be used to measure air quality in enclosed spaces not otherwise monitored by a web-mounted sensor device. The hand-held units can also be used to measure air quality at various points within larger enclosed spaces such as conference rooms, since there could be substantial variability.

DESCRIPTION OF THE DRAWINGS

The invention is better understood by reading the following detailed description of the invention in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Figure 1:
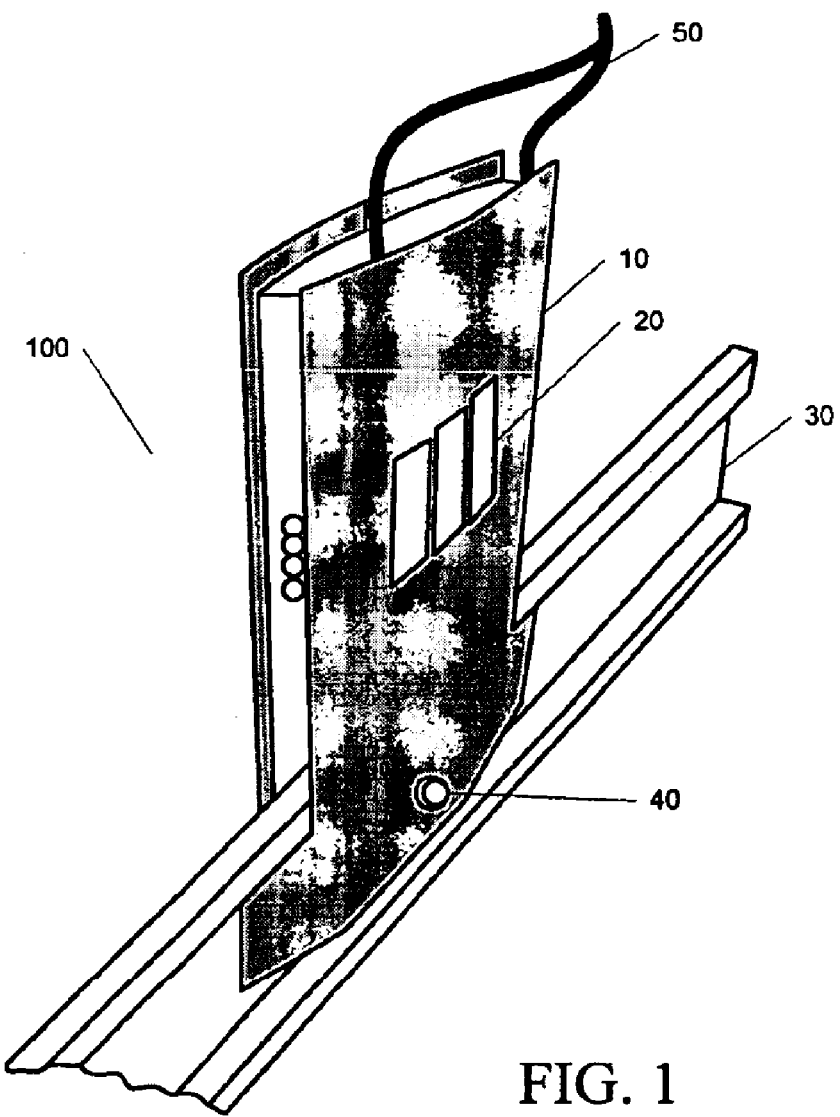
FIG. 1 illustrates a front perspective view of a ceiling grid mounted pollution sensor showing the air exhaust slots in the face of the pollution senor housing.
Figure 2:
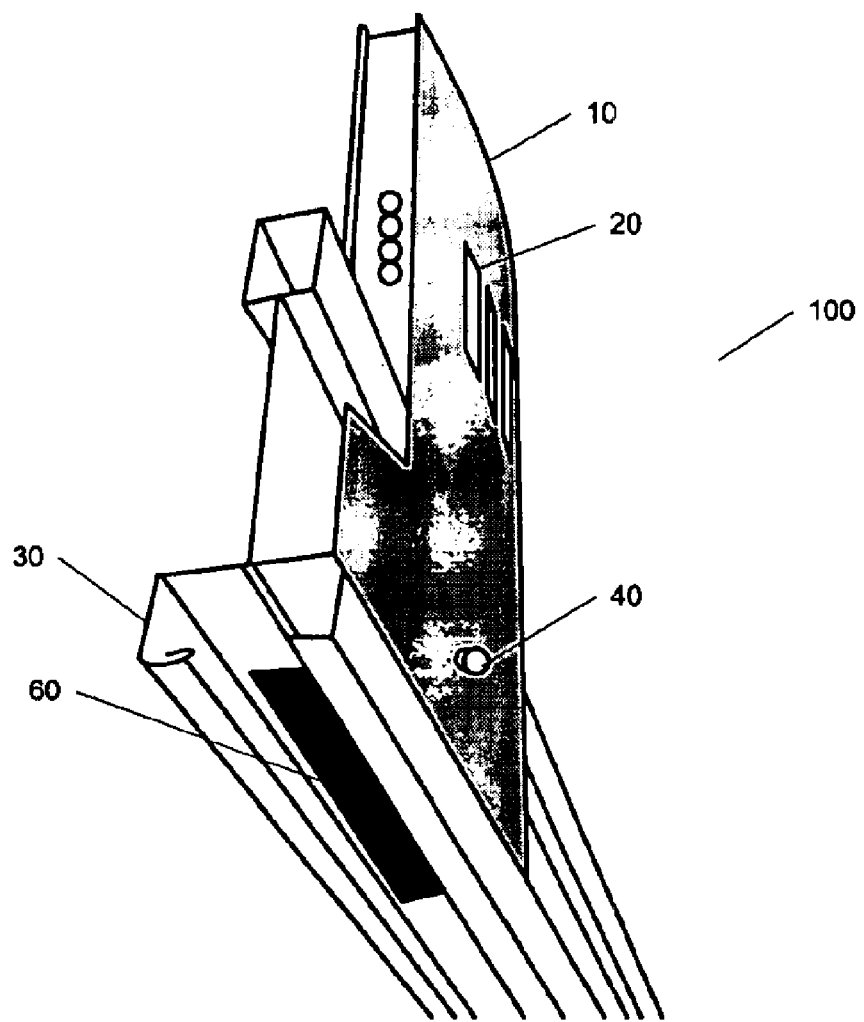
FIG. 2 illustrates a bottom perspective view of a ceiling grid mounted pollution sensor showing the slot in the ceiling grid that enables air intake and sampling.

FIGS. 1–2 depict two perspective views of the ceiling grid mounted pollution sensor. FIG. 1 shows a "front" perspective view of the pollution sensor module mounted to the ceiling grid with multiple slots allowing air to exit the sensor module. FIG. 2 shows a "bottom" perspective view of the pollution sensor mounted to the ceiling grid with a slot cutout for allowing air to enter the module. The ceiling mounted sensor module 100 is encapsulated in a housing 10 which is attached to the web 30 of the ceiling grid by bolt or screw 40. The face of the grid member has a slot 60 that allows the air to enter the sensor module. The sensor module housing 10 has slots 20 in its side to allow the air to exit. As the air flows by the sensors, its temperature and composition is established. The output signal of the sensor module containing information about the air is sent via either a wired connection 50 or wireless means to the HVAC or VAV controls.

Figure 3:
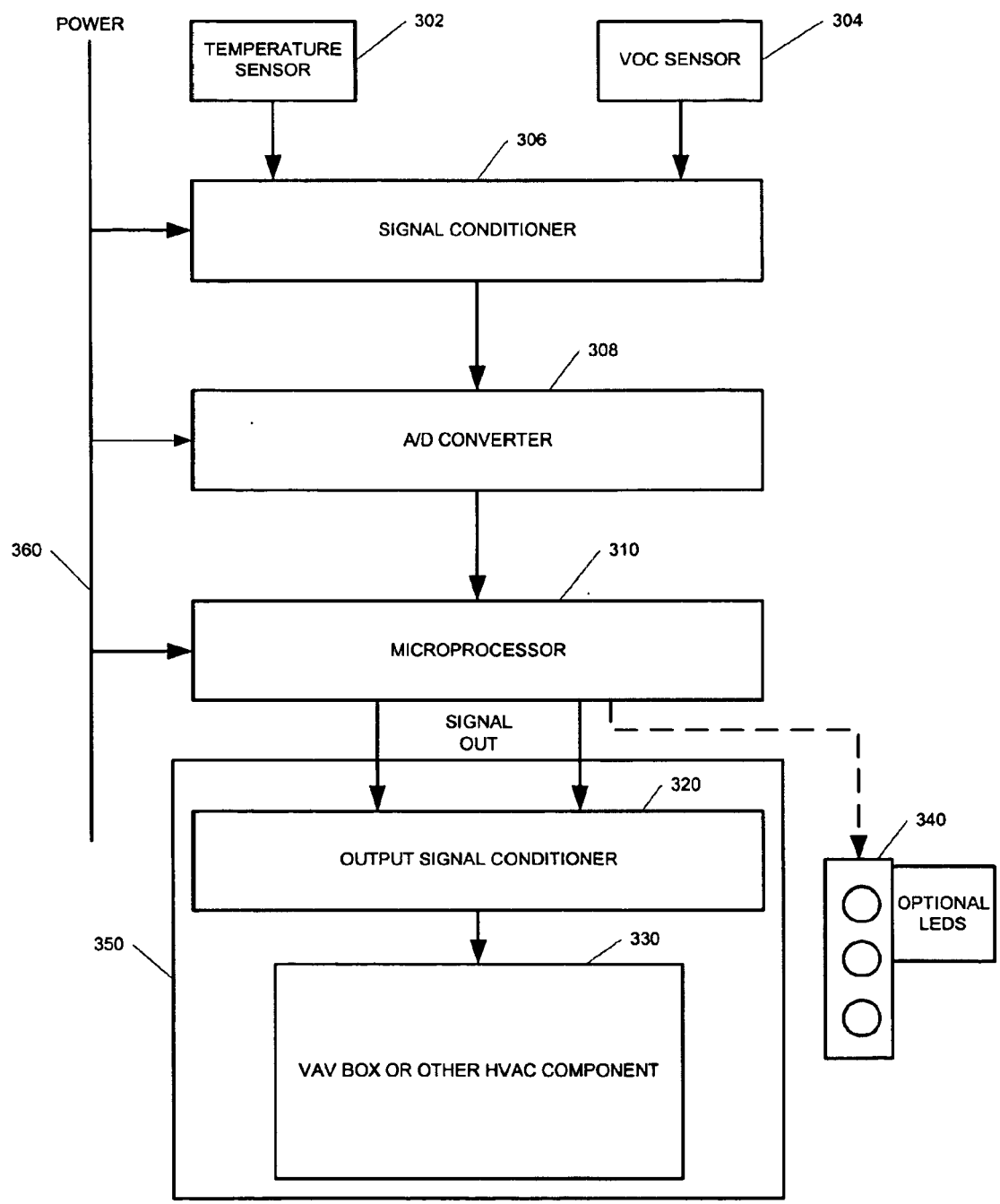
FIG. 3 illustrates a block diagram of the ceiling grid mounted pollution sensor module in accordance with an exemplary embodiment of the invention.

A block diagram of the sensor module is illustrated in FIG. 3. Power is supplied to module components by line voltage 360. Both the temperature 302 and VOC 304 sensors provide analog output signals that are proportional to the corresponding measured variable. These signals must be conditioned (e.g., amplified) by the signal conditioner 306 before being converted to digital signals. The analog to digital converter (A/D) 308 converts the analog signals into digital signals. It also manages conversion resolution and accuracy. The digital signals are input into the central microprocessor 310. The microprocessor 310 manages the communication with the sensors 302, 304, determines sampling intervals, stores program and data memory and performs any additional function that the end user desires. The digital signal output from microprocessor 310 can be provided to optional LEDs 340 to provide a visual indication of the measured air quality in an enclosed space. The digital signal is sent to the HVAC actuator system 350, which may be a simple VAV box or a more complex HVAC unit 330. The output signal from the microprocessor 310 is conditioned in output signal conditioner 320 before being input to the VAV or HVAC unit 330. Optionally, a filter can be added to keep the VOC sensor element clean from dust that may affect its functionality. An advantage of the invention is that it provides the opportunity for demand-controlled ventilation. As such, it provides more comfort to the occupants and reduces energy costs. Since all HVAC systems depend upon the introduction of fresh air into buildings, the primary users of the invention would be building owners and HVAC installers.

The ceiling mounted sensor module provides a number of advantages over prior art solutions. Locating the sensor module in the moving air stream is a significant innovation since the air flow from the room and into the plenum passes directly by the sensor module. Therefore, air quality is being measured at an optimum location. The sensor module taught herein removes the thermostat from the wall, thereby reducing wiring costs. A further benefit is that employees are no longer able to tamper with thermostats that may control the temperature setting for a number of adjacent rooms in the building. Since the sensor module is located in the moving air stream, it is less visible and less susceptible to damage. Since temperature alone does not provide a good indication of air quality, the sensor module provides more accurate analysis of the air, allowing closer control of fresh air mixing, thereby resulting in energy savings and a better indoor environment for occupants. The sensor modules can be distributed easily in the ceiling grid system, allowing larger amounts of air to be sampled. Since the sensor modules are mounted to the ceiling grid structure, they do not have to be removed when ceiling panels are replaced. Incorporating VOC sensors into the sensor module also produces a significant reduction in cost associated with installation of $CO_2$ sensors.

Figure 4:
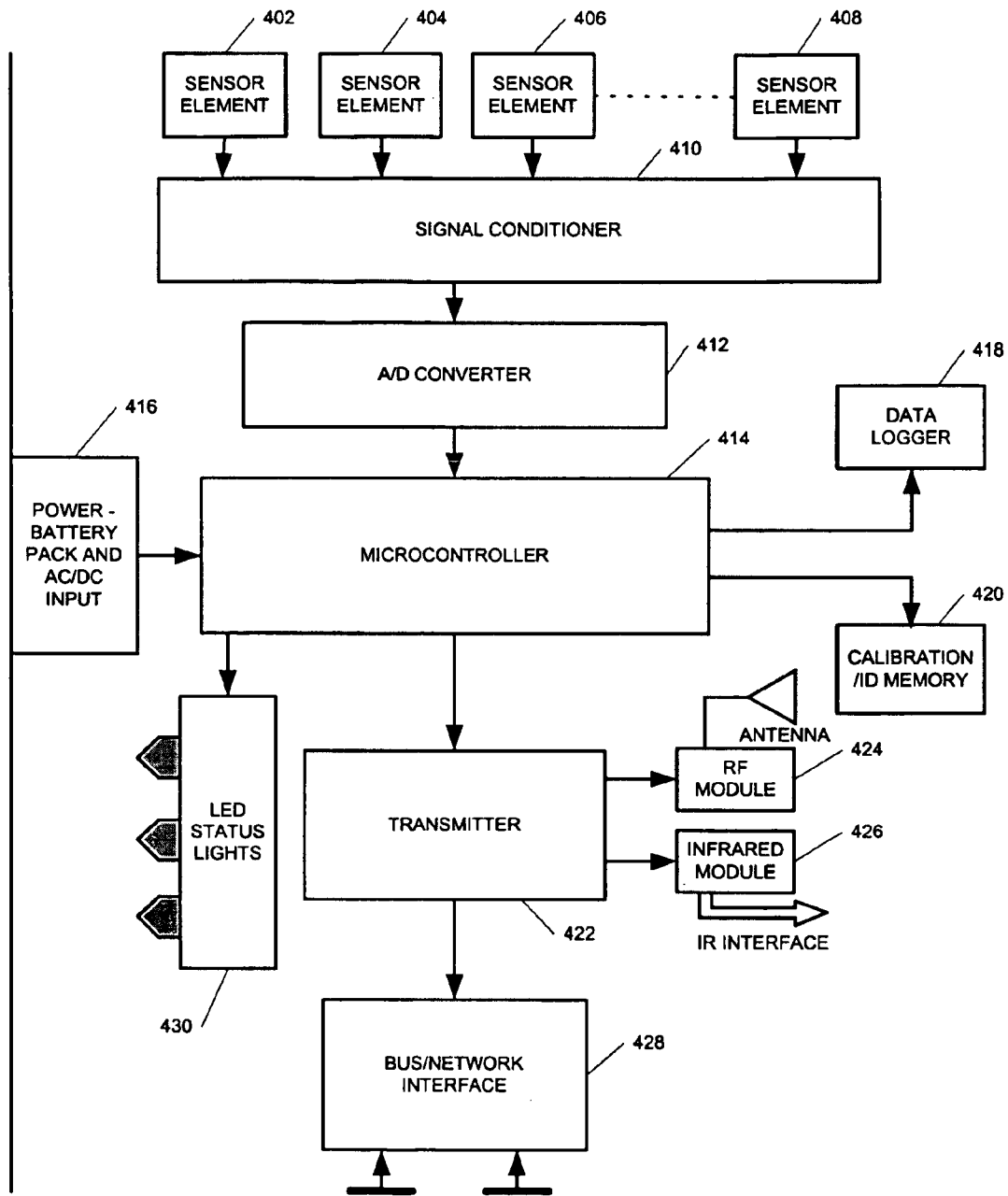
FIG. 4 illustrates a block diagram of a hand-held pollution testing device in accordance with an exemplary embodiment of the invention.

A block diagram of a hand-held pollution tester is depicted in FIG. 4. The hand-held unit is capable of monitoring changes caused by the introduction of new materials during business construction. For example, the adverse effects of new carpeting or furniture can be established immediately. The data can also be stored within the device for future reference or evaluation. The sensor elements 402, 404, 406, 408 collect sensor-specific information about the environment surrounding the tester. The sensor signal is conditioned or compensated for secondary parameters such as temperature, and is calibrated for offset or amplified. Calibration/ID memory 420 is used for calibrating the sensor signals. The analog sensor signal conditioning is performed in signal conditioner 410. The high-level analog signal is converted to digital format in the analog to digital converter (A/D) 412 for use in the digital control system represented by the microcontroller 414. The microcontroller 414 performs the necessary computations and other functions. The transmitter module 422 prepares the signal for transmission to the receiving units (not shown). The transmission can uniquely be performed in a variety of ways. The serial interface 428 allows direct connection to a laptop computer through an RS-232 serial port 434 shown in FIG. 5). The RJ-45 port (432 in FIG. 5) allows connection to an Ethernet or other local area network. Alternatively, the data can be wirelessly sent through radio frequency (RF) module 424 or infrared (IR) module 426. If the sensor data is not required in real-time, the sensor data can be logged (i.e., stored in the handheld unit's memory) in data logger 418 and downloaded at a later time. The power pack 416 allows operation either via a battery pack or an alternating current line voltage 460. The status of the air samples measured by the hand-held tester can be monitored by the colored LEDs 430.

Figure 5:
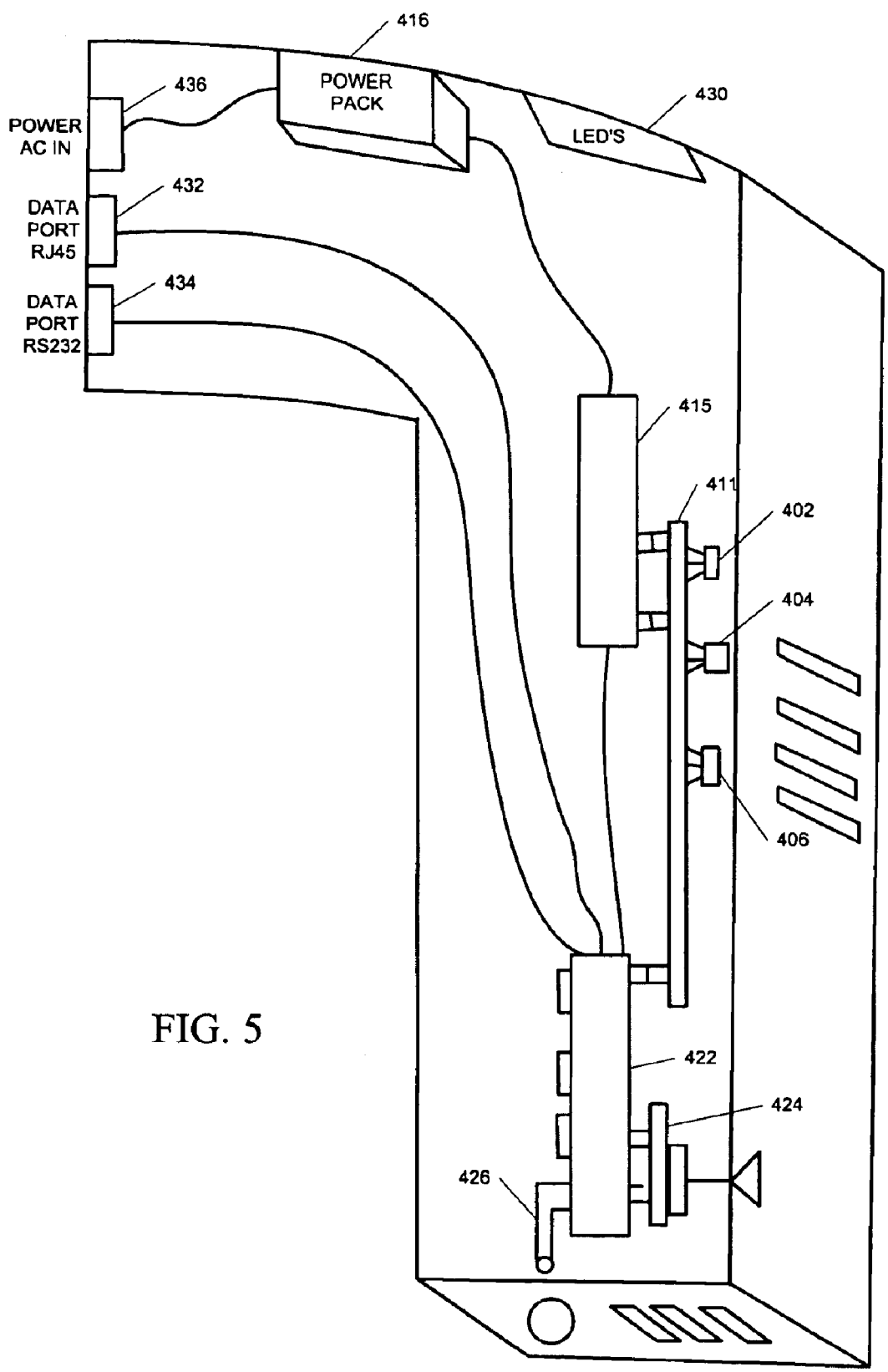
FIG. 5 illustrates a configuration of a hand-held pollution tester device in accordance with an exemplary embodiment of the invention.

A basic physical configuration of the hand-held pollution tester device is depicted in FIG. 5. In addition to AC power input 436, RJ-45 data port 432, RS-232 data port 434, power pack 416, LEDs 430, transmitter 422, RF module 424, and IR module 426, the configuration also shows microprocessor 415, sensor board 411 and environmental sensors 402, 404, 406.

The hand-held pollution tester is capable of testing for several environmental variables in real-time. It allows the monitoring or changes caused by the introduction of new materials during building construction. For example, the adverse effects of new carpeting or furniture can be established immediately. The data can also be stored within the device's data logger 418 for future reference or evaluation.

The corresponding structures, materials, acts, and equivalents of all means plus function elements in any claims below are intended to include any structure, material or acts for performing the functions in combination with other claim elements as specifically claimed.

Those skilled in the art will appreciate that many modifications to the exemplary embodiments of the present invention are possible without departing from the spirit and scope of the present invention.

What is claimed is:

1. A ceiling system for monitoring indoor air quality, the system comprising:
    a grid member having a vertical web portion and a flange portion arranged substantially perpendicular to the vertical web portion, the flange portion having a slot for allowing air to pass through the grid member; and
    a sensor module mounted to the grid member, the sensor module having a housing which includes an inlet port positioned adjacent the slot of the flange portion, the sensor module having a plurality of sensors contained within the housing,
    wherein each sensor monitors a specific characteristic of an air sample received through the inlet port of the housing.

2. The ceiling system of claim 1 wherein the plurality of sensors comprise a temperature sensor and a volatile organic compound (VOC) sensor.

3. The ceiling system of claim 2 further comprising a signal conditioner for amplifying an analog output signal from both the temperature sensor and the VOC sensor.

4. The ceiling system of claim 3 further comprising an analog to digital converter to convert the conditioned analog output signals to digital signals.

5. The ceiling system of claim 1 wherein the housing comprises a front cover and a rear cover, wherein the front cover and rear cover each include a slot which enables an air sample to exit the housing.

6. A sensor system for monitoring indoor air quality, comprising:
- a hand-held sensor device having a housing, the housing includes an air inlet port and a plurality of sensors, the plurality of sensors being contained in the housing and wherein each sensor monitors a specific characteristic of an air sample received through the air inlet port of the housing; and
- a microprocessor which evaluates the air sample and sends an output signal to a building energy management system for controlling a temperature and a mix of indoor air with fresh outdoor air, the microprocessor being wirelessly connected to the sensor device.

7. The sensor system of claim 6 wherein the plurality of sensors comprise a temperature sensor and a volatile organic compound (VOC) sensor.

8. The sensor system of claim 7 further comprising a signal conditioner for amplifying an analog output signal from both the temperature sensor and the VOC sensor.

9. The sensor system of claim 8 further comprising an analog to digital converter to convert the conditioned analog output signals to digital signals.

10. The sensor system of claim 9 wherein the microprocessor receives and processes the digital signals from the analog to digital converter.

11. The sensor system of claim 6 wherein the microprocessor determines a temperature and a composition of the air sample.

12. The sensor system of claim 6 wherein the building energy management system is a heating, ventilating and air conditioning (HVAC) system.

13. The sensor system of claim 6 wherein the building energy management system is a variable air volume (VAV) system.

14. The sensor system of claim 6 wherein the output signal is transmitted to the building energy management system by a wireless connection.

15. The sensor system of claim 14 wherein the output signal is transmitted by a radio frequency (RF) module.

16. The sensor system of claim 14 wherein the output signal is transmitted by an infrared module.

17. The sensor of claim 6 wherein the output signal is transmitted to the building energy management system by a wired connection.

18. The sensor system of claim 6 further comprising a plurality of slots in the housing to enable the air sample to exit from the housing.

19. The sensor system of claim 6 further comprising a memory module for storing a plurality of sensor data for subsequent downloading to a computer device or network.

20. The sensor system of claim 6 further comprising a light emitting diode to provide a visual indication of indoor air quality in response to an air quality status signal from the microprocessor following evaluation of the air samples.

21. The sensor system of claim 20 wherein the light emitting diode is a three-state diode, with each state corresponding to a specific status of indoor air quality.

22. A method for providing demand-controlled ventilation in an enclosed space in a building, comprising the steps of:
- determining a location in a ceiling grid for mounting a multi-sensor module;
- fabricating a slot in a lower surface of the ceiling grid at the determined location;
- mounting the multi-sensor module to a web of the ceiling grid at the determined location, the multi-sensor module having an air inlet port, the air inlet port being positioned adjacent the fabricated slot;
- sampling an air flow stream from below the multi-sensor module which passes through the fabricated slot and air inlet port of the multi-sensor module; and
- evaluating the air flow stream sampled by the multi-sensor module to determine the characteristics; and
- transmitting from the multi-sensor module an output signal representative of the determined characteristics of the air flow stream to a building energy management system to control the temperature and mix of air in the enclosed space.

23. The method of claim 22 wherein each sensor in the multi-sensor module monitors a different characteristic of the air flow stream sampled.

24. The method of claim 22 wherein the multi-sensor module includes a temperature sensor and a volatile organic compound (VOC) sensor.

25. The method of claim 24 further comprising the step of amplifying an analog signal output from both the temperature sensor and the VOC sensor.

26. The method of claim 22 further comprising the step of determining a temperature and composition of the air flow stream sampled by each multi-sensor module.

* * * * *